Sept. 7, 1926.
J. METTLER
1,598,739
RECORDING DEVICE IN PERIODICALLY RECORDING APPARATUS
Filed August 20, 1924
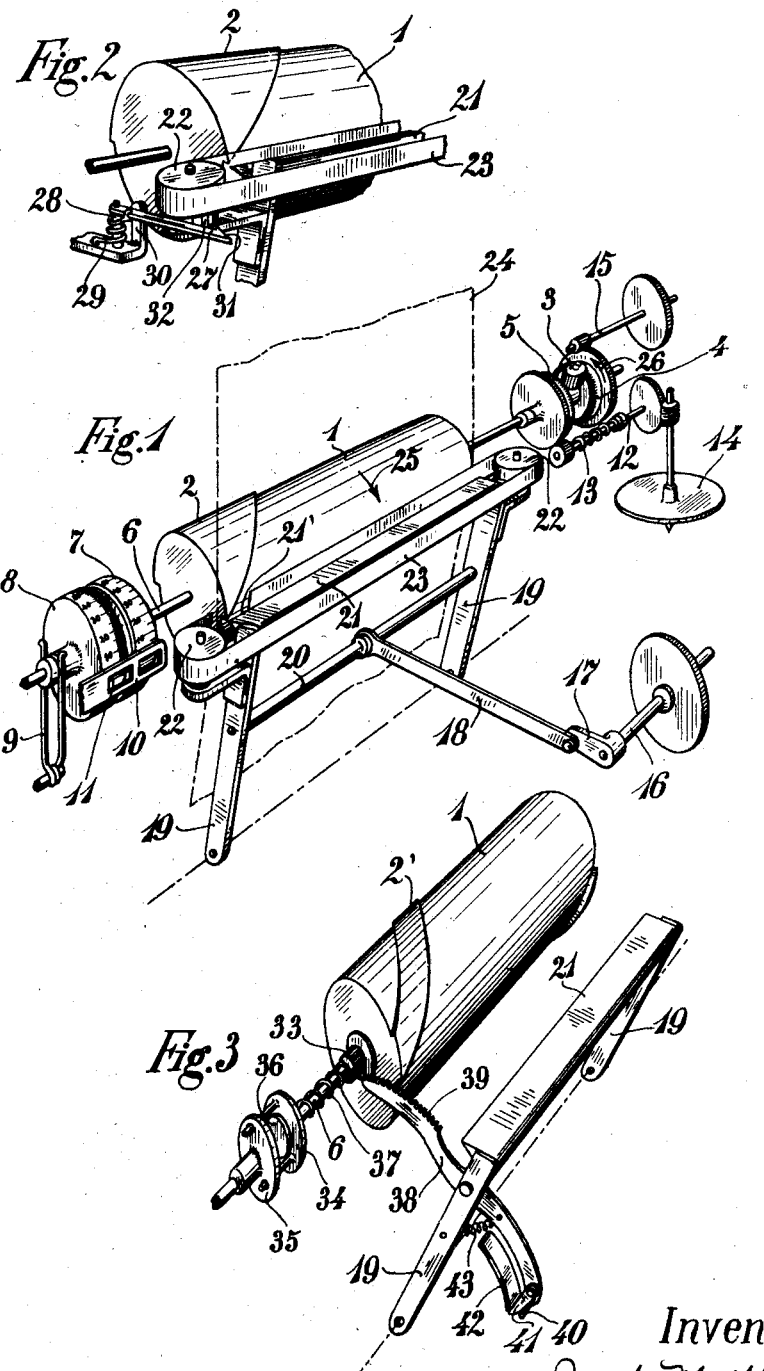
Inventor:
Josef Mettler
By B. Singer Atty.

Patented Sept. 7, 1926.

1,598,739

UNITED STATES PATENT OFFICE.

JOSEF METTLER, OF ZUG, SWITZERLAND, ASSIGNOR TO LANDIS & GYR S. A., OF ZUG, SWITZERLAND (A SWISS FIRM).

RECORDING DEVICE IN PERIODICALLY-RECORDING APPARATUS.

Application filed August 20, 1924, Serial No. 733,139, and in Switzerland August 28, 1923.

The known recording devices in periodically recording apparatus, in which the record consists of lines drawn on a paper chart, all have the disadvantage that the writing member which produces the lines requires a good deal of power for its operation and hence puts a heavy load on the apparatus.

It is true that this type of apparatus has recently been improved, in that, at least the movement of the writing member while the record is being made, is effected by a separate source of power independent of the source of power of the recording device itself. The construction of these instruments is, however, rather complicated, seeing that they comprise a comparatively large number of detail parts.

The present invention relates to a recording device of the type referred to. It is, however, based on a principle which permits a much simpler design of the entire instrument and which allows the load to be removed to a great extent from the actual source of power of the instrument. According to the invention, lines are produced by a momentary pressure of the paper chart and a carbon insert between a rotary body rotating at a speed proportional to the consumption and a ruler-shaped body, this pressure being caused by a movement of the ruler-shaped body towards the rotating body at the end of each resetting period.

In the drawing several examples of construction are shown diagrammatically. Fig. 1 illustrates the first example of construction and Fig. 2 is a detail of a possible modification. Fig. 3 shows a second example of construction.

In the first example of construction the peripheral surface of the drum 1 is cut away so as to leave a helical surface 2. The drum 1 is rigidly mounted together with the spindle of the sun wheel 3 of a differential gear 3, 4, 5 on a spindle 6, which is also attached to a graduated drum 7. A second graduated drum 8 rides loosely on a shaft 6 and is under the action of a brake spring 9. The markings of the two graduated drums 7, 8 can be read off through a stationary observation device 10, a thread or wire 11 being provided in the corresponding aperture for accurately reading off the value shown on the finely divided scale on the drum 8.

The sun wheel 5 of the differential gear 3, 4, 5 is coupled to the driving disc 14 of the driving element of the instrument by a shaft 12 on which is mounted a friction clutch formed by a spring 13. The sun wheel 3 is connected through gears 15 to a separate source of power not shown in the drawing, but which may, for example, be an electric motor. Connected to this source of power is a shaft 16, on which is mounted a crank 17. To the crank 17 is hinged a rod 18 which engages with a cross rod 20 serving to couple together two oscillating levers 19. A ruler-shaped body 21 is mounted between the two oscillating levers 19 and its edge 21' which faces the drum 1, extends over the whole length of the latter. On the oscillating levers 19 are mounted rollers 22 around which is stretched an endless copying ribbon 23. A portion of this copying ribbon 23 lies just in front of the longitudinal edge 21'. Between this portion of the ribbon and the drum 1 moves a paper chart 24.

At the commencement of the resetting period the beginning of the surface 2 of the drum 1 lies opposite the longitudinal edge 21' of the ruler-shaped body 21 (see Fig. 1), whilst this body 21 is swung away from the drum 1. The paper chart 24 is located preferably at a short distance from the surface 2 of the drum 1. The gears 15 and the chart 16 are stationary, whilst the drum 1 is rotated in the direction of the arrow 25 at a speed proportional to the amount of energy consumed, through the medium of the planet wheel 3 rolling on the sun wheel 4. The graduated drum 7 also advances the graduated drum 8, by means of a projection not shown in the drawing provided the said drum 8 previously stood at zero. At the end of the resetting period the separate power source is automatically switched on by a clock movement and this first sets the shaft 16 in motion. The shaft 16, in turn, moves the ruler-shaped body 21 towards the drum 1, by means of the crank 17 and the rod 18. The paper chart 24 and the said portion of the ribbon are thus pressed momentarily between the longitudinal edge 21' of the ruler-shaped body 21 and the surface 2 of the drum and a line is printed on the paper chart 24. This line corresponds with the projection of the surface 2 in a horizontal direction opposite the longitudinal edge 21', at the moment when the pressure is applied. After the ruler-shaped body 21 has returned to its position of rest or even during this movement, the countershaft 15 is set in motion by a separate power source and drives the sun wheel 4 in the direction of the arrow 26 at a higher speed than that at which the driving disc 14, which still acts on the sun wheel 5, drives the latter. Thus the planet wheel 3 rolls in the opposite direction to that in which it rolled previously and turns the drum 1 backwards. Having reached its position of rest (Fig. 1) the drum 1 is arrested by a stop not shown in the drawing, whilst the countershaft 15 continues to run for a short time. During this time the sun wheel 5 rotates at a higher speed than that at which it is driven by the driving disc 14, so that the friction clutch formed by the spring 13 comes into action. This clutch renders any recoil action, due to the reverse rotation of the drum 1, uninjurious to the driving disc 14. The graduated drum 7 turns backwards into its zero position with the drum 1, whilst the graduated drum 8, which is held by the brake spring 9, remains in the position into which it has previously been moved by the graduated drum 7. Thus the graduated drum 7 indicates the consumption at any moment, whilst the graduated drum 8 indicates the maximum value of the demand during all the preceding resetting periods.

The feed of the paper chart can be effected in any suitable known manner and may be continuous or intermittent, and can be effected either by the clockwork controlling the separate power source, or by this power source itself. The feed of the copying ribbon 23 can also be arranged in any suitable manner. It may be continuous and effected by the clockwork, or it may also be intermittent and effected from the separate power source, for instance.

The ribbon feed can also be effected as shown in Fig. 2, by means of a pawl 27. This pawl 27 is rotatable on a fixed stud 28, is pressed against a stop 30 by the action of a torsion spring 29 and is provided at its free end with an inclined surface 31. A ratchet wheel 32 is secured to the roller 22 over which the ribbon is guided. When the ruler-shaped body 21 is swung towards the drum 1, the ratchet 27 rides over the ratchet wheel 32 by means of the surface 31, whilst when the body 21 swings away from the drum, said pawl 27 engages with the ratchet wheel 32 and advances same together with the roller 22 and the ribbon 23.

The reverse rotation of the drum 1 can also be derived from the oscillating movement of the ruler-shaped body 21. Such an example of construction is shown in Fig. 3. In this case the drive of the ruler-shaped body 21 is the same as in the first example of construction, but the drive of the drum 1 from the separate source of power is omitted, and hence also the differential gear. On the shaft 6 of the drum 1 is loosely mounted a pinion 33 and also one half 34 of a dog clutch 34, 35. The second half 35 of the clutch is connected to a graduated drum not shown in the drawing. The shaft 6 has a flange 36, and at the other end against the drum 1, forms a clutch between the drum 1, the pinion 33, and the coupling 34, 35. To one of the oscillating levers 19 is hinged a lever 38 whose end projects towards the pinion 33 and is in the form of a toothed segment 39. The other end of the lever 38 is provided with a stop pin 40 and a pawl 41. In addition to co-operating with the stop pin 40, the pawl 41 also co-operates with a fixed guide 42 which latter is bent to a radius corresponding with the distance from the axis of rotation of the oscillating levers 19. A tension spring 43 always tends to pull the toothed segment 39 upwards.

At the end of each resetting period the ruler-shaped body 21 is moved, as in the first example, towards the roller 1, so as to produce the record by means of the carbon insert and the paper chart, which two parts are not shown in this figure. At the beginning of this movement the pawl 41 strikes against the front edge of the guide 42, and being prevented from swinging outwards by the stop 40, slides up and along the guide 42. As a result, the toothed segment 39 is pressed downwards and passes under the pinion 33 without engaging with the latter. At the end of the oscillating movement of the ruler-shaped body 21 towards the drum, 1, the pawl 41 slides off the guide 42 and the spring 43 brings the toothed segment 39 into gear with the pinion 33, so that during the following return movement of the body 21, the pinion 33 is rotated in the opposite direction to that in which it previously moved, and turns the drum 1 back to its zero position. During this return movement the pawl 41 is drawn over the guide 42, whilst bearing lightly thereon. The drum 1 reaches its zero position, which is determined by a stop not shown in the drawing, before the toothed segment 39 and the pinion 33 are disengaged from one another. As soon as this occurs, the pinion 33 slips on the spindle 6 and on the drum 1 by reason of the spring clutch 37. The scale disk is fastened on the disk 35 with the shaft 6 of the roller 1, but coupled by means of the parts 34, 36 with the roller 1, said parts being in frictional engagement by the action of the spring 37. A lug of the scale disk corresponds with a stationary lug, so that these lugs will abut if the scale disk is in the zero position.

If the roller 1 is rotated by the counter according to the consumption of force the disk 35 and therewith the scale disk will be taken along by means of the friction of the tooth plunger 33 relative to the roller 1 and of the flange 36, relative to the disk 34.

If at the end of the registering period the tooth segment 39 engages the tooth plunger 33, the roller 1 of the scale disk will be returned again to the zero position through the friction of the parts 1, 33, 36 and 34 then the tooth plunger will rotate further till the tooth segment 39 will be disengaged relative to the plunger. During this time the tooth plunger will rotate on the roller, that means the tooth plunger slips with respect to the roller 1 and the disk 35.

The non-rigid connection of the scale disk with the roller greatly facilitates the adjustment of these parts. The return movement of the drum 1 has no detrimental effect on the instrument, since as in the first example of construction, a friction clutch is inserted between the roller 1 and the driving disc.

In the example of construction last described, the surface of the drum 1 forming the projection 2' is only slightly raised from the periphery of the drum, and thus this raised portion extend like a narrow band spirally around the drum. In this case the separate lines produced on the paper chart do not extend, as in the first constructional example, from a base line representing the zero point, to the maximum during the resetting periods of which they form a record.

What I wish to secure by U. S. Letters Patent is:—

1. In a recording device in periodically recording apparatus, particularly in such of an electrical nature in which the record is in the form of lines marked on a paper chart, a rotary body rotating at a speed proportional to the consumption, a ruler shaped body and means which produce the lines on the paper chart which by their length correspond to the temporary consumption of energy by a momentary pressure of the paper chart and a copying inset between the rotary body and the ruler shaped body at the end of each resetting period.

2. In a recording device in periodically recording apparatus, particularly in such of an electrical nature in which the record is in the form of lines marked on a paper chart which by their length correspond to the temporary consumption of energy, a rotary body rotating at a speed proportional to the consumption, a ruler shaped body arranged with its edge opposite to the rotary body and a special power source independent of the actual power source of the recording apparatus driving the rotary body, said special power source being controlled by a time switch mechanism and pressing the edge of the ruler shaped body together with the paper chart and a copying inset against the rotary body at the end of each resetting period.

3. In a recording device in periodically recording apparatus, particularly in such of an electrical nature in which the record is in the form of lines marked on a paper chart which by their length correspond to the temporary consumption of energy, a rotary body rotating at a speed proportional to the consumption, a ruler shaped body and a special power source independent of the actual power source of the recording apparatus driving the rotary body at the end of each resetting period, and a differential gear through which differential gear the special power source is actively coupled to the actual power source of the recording apparatus and to the rotary body, whereby the special power source effects the return of the rotary body to its zero position at the end of each resetting period.

4. In a recording device in periodically recording apparatus, particularly in such of an electrical nature in which the record takes the form of lines on a paper chart which by their length correspond to the temporary consumption of energy, a rotary body rotating at a speed proportional to the consumption, said rotary body having a spirally wound surface forming part of a cylindrical periphery, a ruler shaped body and means which press said ruler shaped body and a copying inset against the cylindrical periphery of the rotary body at the end of each resetting period.

5. In a recording device in periodically recording apparatus, particularly in such of an electrical nature, in which the record takes the form of lines on a paper chart which by their length correspond to the temporary consumption of energy, a rotary body rotating at a speed proportional to the consumption, said rotary body being a drum a portion of whose periphery is raised so as to form a spirally wound surface, a ruler shaped body and means which press said ruler shaped body and a copying inset against the surface of the rotary body at the end of each resetting period.

6. In a recording device in periodically recording apparatus, particularly in such of an electrical nature in which the record takes the form of lines marked on a paper chart which by their length correspond to the temporary consumption of energy, a rotary body rotating at a speed proportional to the consumption, a ruler shaped body which ruler shaped body has a knife edge facing the rotary body, and oscillating levers which carry the ruler shaped body and which are moved by a separate source of power at the end of each resetting period and thus by means of the said knife edge press the chart and a copying inset against the rotary body.

7. In a recording device in periodically recording apparatus, particularly in such of an electrical nature in which the record takes the form of lines marked on a paper chart which by their length correspond to the temporary consumption of energy, a rotary body rotating at a speed proportional to the consumption, a ruler shaped body and a copying inset between the paper chart and the ruler shaped body, said copying inset being in the form of an endless band which is guided over rollers mounted on the supports of the ruler shaped body and means which, at the end of each resetting period, press the ruler shaped body, together with the copying inset and the paper chart, against the rotary body.

In testimony whereof I affix my signature.

JOSEF METTLER.